(12) United States Patent
Goodman et al.

(10) Patent No.: US 12,413,422 B2
(45) Date of Patent: Sep. 9, 2025

(54) SYSTEM AND METHOD FOR EFFICIENT VERIFICATION OF AUTHORITY FOR INVOCATION OF OPERATIONS

(71) Applicant: Dell Products L.P., Round Rock, TX (US)

(72) Inventors: Bradley K. Goodman, Nashua, NH (US); James Daniel Harms, Worthington, OH (US)

(73) Assignee: Dell Products L.P., Round Rock, TX (US)

( * ) Notice: Subject to any disclaimer, the term of this patent is extended or adjusted under 35 U.S.C. 154(b) by 326 days.

(21) Appl. No.: 18/301,627

(22) Filed: Apr. 17, 2023

(65) Prior Publication Data
US 2024/0348458 A1  Oct. 17, 2024

(51) Int. Cl.
*H04L 9/32* (2006.01)
*H04L 9/08* (2006.01)

(52) U.S. Cl.
CPC .......... *H04L 9/3265* (2013.01); *H04L 9/0825* (2013.01); *H04L 9/3268* (2013.01)

(58) Field of Classification Search
CPC ... H04L 9/3265; H04L 9/0825; H04L 9/3268; H04L 9/3247; H04L 9/50
See application file for complete search history.

(56) References Cited

U.S. PATENT DOCUMENTS

| | | | | |
|---|---|---|---|---|
| 8,140,843 B2* | 3/2012 | Holtzman | ............. | H04L 9/3273 713/156 |
| 11,683,188 B2* | 6/2023 | Jones | .................... | H04L 9/3268 713/157 |
| 2003/0115457 A1* | 6/2003 | Wildish | ................ | H04L 9/3265 713/157 |
| 2004/0073801 A1* | 4/2004 | Kalogridis | ................ | H04L 9/50 713/176 |
| 2016/0127341 A1* | 5/2016 | Yan | ........................ | H04L 9/3247 726/9 |

* cited by examiner

*Primary Examiner* — Hany S. Gadalla
(74) *Attorney, Agent, or Firm* — WOMBLE BOND DICKINSON (US) LLP

(57) ABSTRACT

Methods and systems for verifying authority in distributed systems are disclosed. Authority may be delegated to various entities within a distributed system to invoke performance of operations within the distributed systems. To verify that authority has been delegated, a security framework may be used that limits computing resource consumption for the verifications. The computing resource consumption may be limited by using cryptographically verifiable data structures that establish chains of delegation of authority. The cryptographically verifiable data structures may be limited in size and content to reduce the computational cost for implementing the security framework.

20 Claims, 10 Drawing Sheets

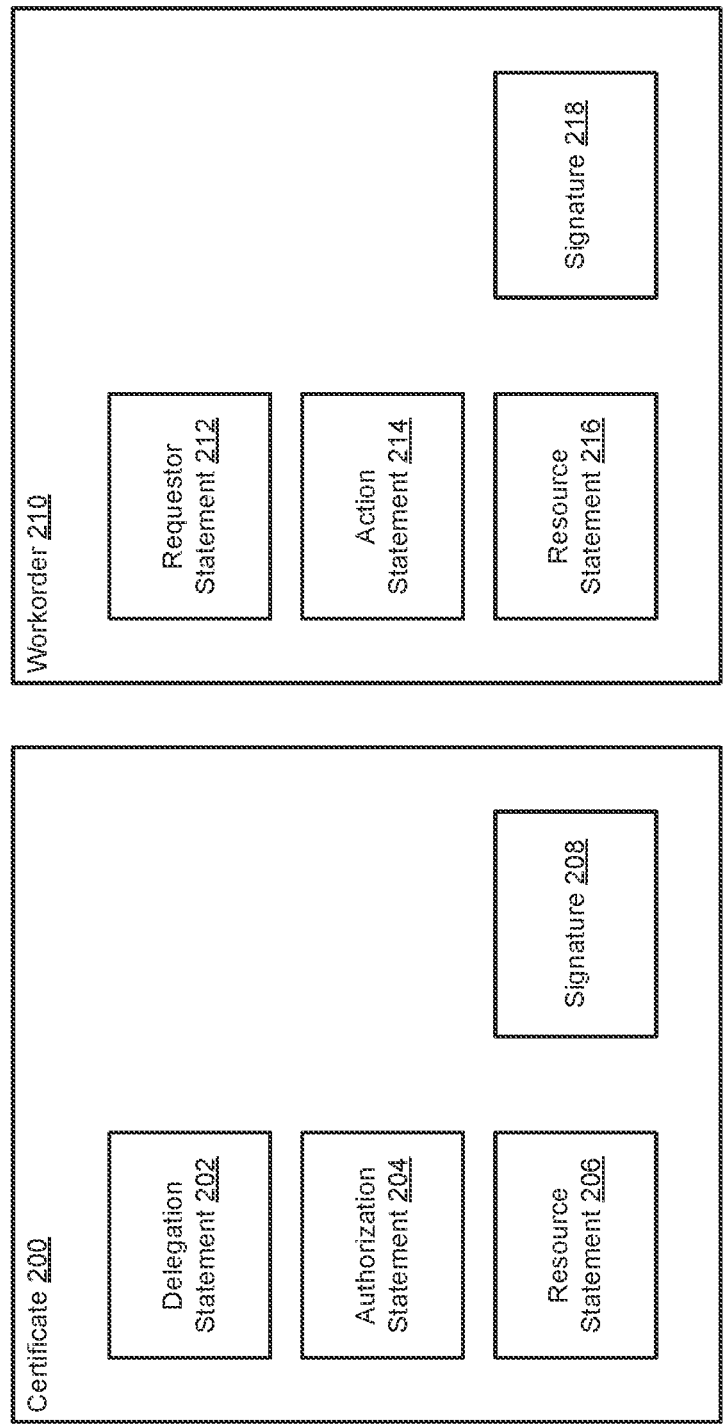

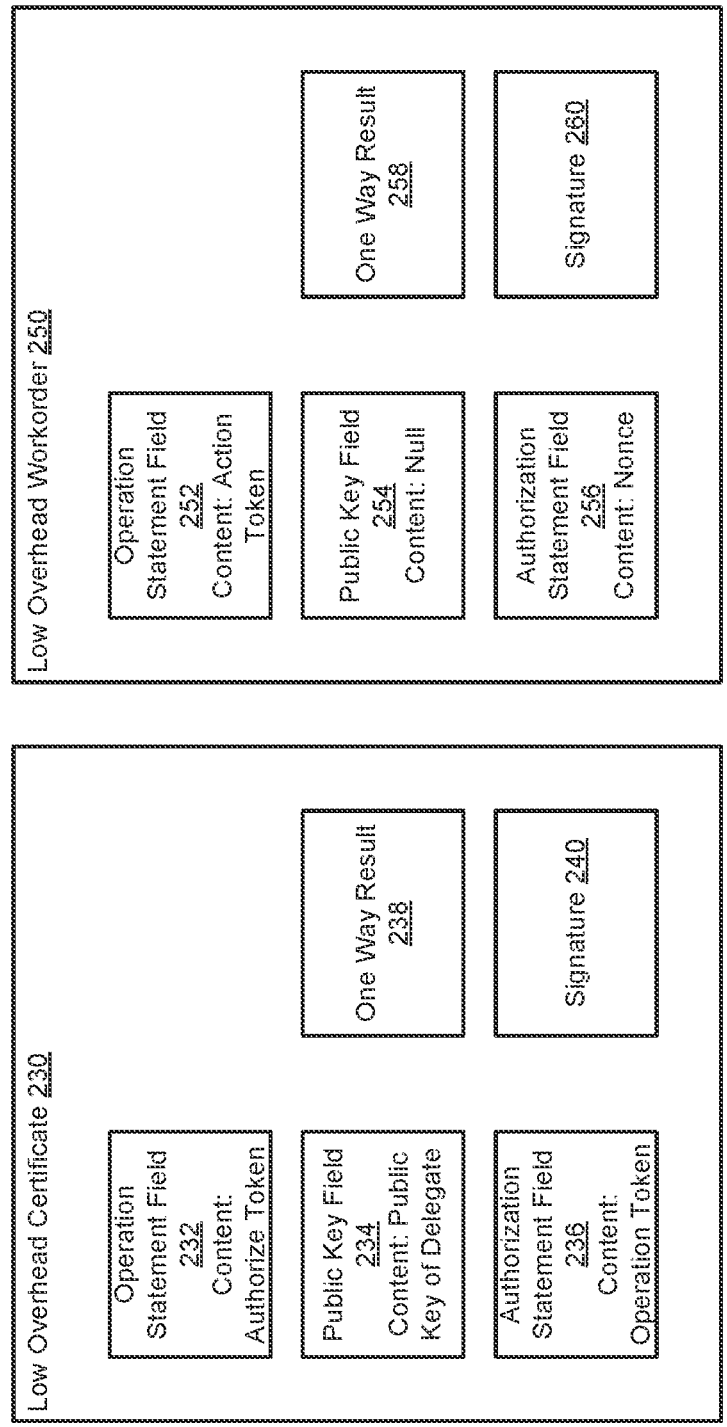

SYSTEM AND METHOD FOR EFFICIENT VERIFICATION OF AUTHORITY FOR INVOCATION OF OPERATIONS

FIELD

Embodiments disclosed herein relate generally to authority verification. More particularly, embodiments disclosed herein relate to systems and methods to efficiently verify authority for invocation of performance of operations.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2A shows a diagram of a certificate in accordance with an embodiment.

FIG. 2B shows a diagram of a workorder in accordance with an embodiment.

FIG. 2D shows a diagram of a low overhead certificate in accordance with an embodiment.

FIG. 2E shows a diagram a low overhead workorder in accordance with an embodiment.

DETAILED DESCRIPTION

Figure 1:
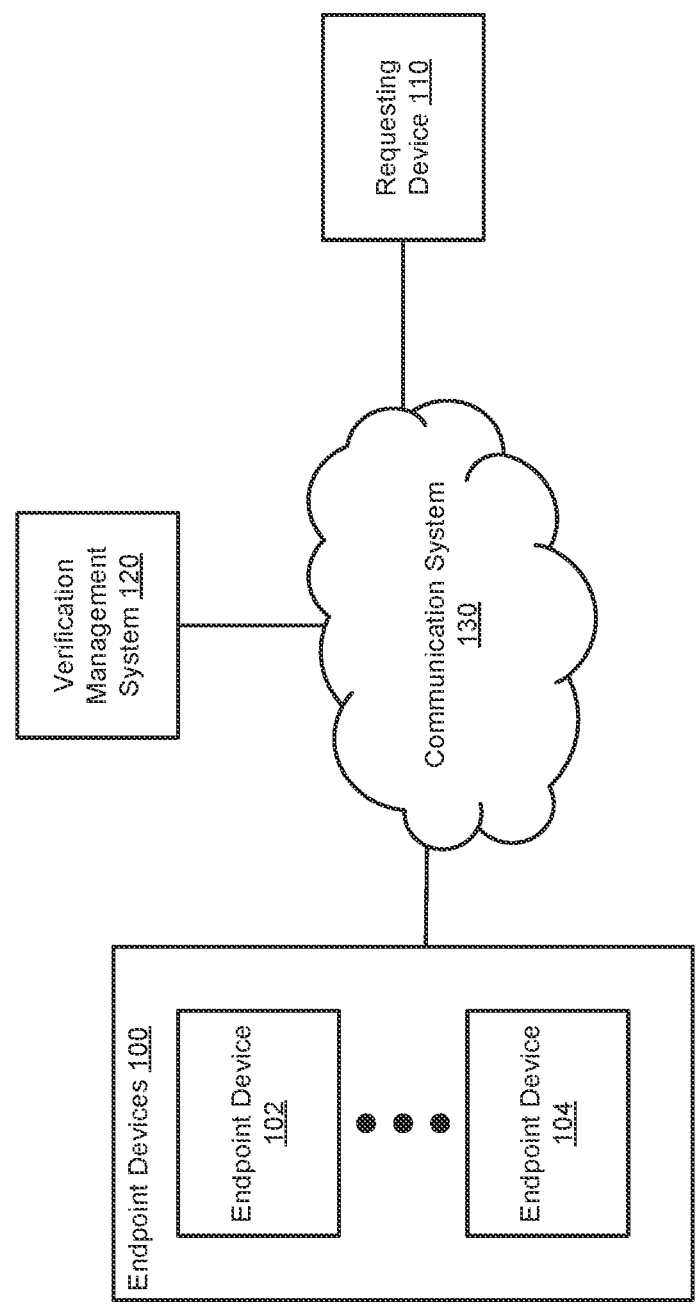
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing performance of computer implemented services. The performance of the computer implemented services may be cooperatively managed by entities in a distributes system, such as various endpoint devices. The computer implemented services may be cooperatively managed by through requests for performance of various operations by the components of the distributed systems.

However, due to the nature of the distributed system, performance of requested operations may present risk to the endpoint devices that perform the operations. For example, malicious entities may send requests for performance of operations that, if performed, may compromise the operation of the endpoint devices or cause other undesirable impacts.

To manage these risks, the endpoint devices may implement a security framework that requires that all requests be verified. The requests may be verified by verifying that authority to request performance of each operation can be traced to a root of trust. The tracing may be performed using certificates that include cryptographically verifiable delegations of authority for operations from the root of authority to the requesting entity.

However, cryptographically verifying certificates and other data structures may be computationally expensive. Consequently, endpoint devices such as microcontrollers or other types of computing devices with limited computing resources may not be able to perform verifications using certificates and other types of data structures.

To facilitate verification of requested operations on such devices, these endpoint devices may implement a security framework that utilizes low overhead certificates and low overhead workorders to verify whether requested operations should be performed. The low overhead certificates and workorders may be used, similarly to certificates, to verify delegation of authority from a root of trust to a requesting entity. However, the low overhead certificates and workorders may facilitate verification of the delegation using limited quantities of computing resources. Consequently, endpoint devices having limited computing resources may be able to verify requests for performances of operations.

The low overhead certificates and workorders may be implemented, for example, using fixed length and fixed data structures, tokenization, a data minimization such that the quantity of information necessary to be stored in memory and computations necessary to be performed to verify the delegations may be reduced when compared to verification using certificates that are not low overhead.

By doing so, embodiments disclosed herein may provide a distributed system that is less susceptible to attacks by malicious entities while still enabling distributed management of the services provided by the system. The disclosed embodiments may do so using a security framework that consumes fewer computing resources for performing verifications. Thus, embodiments disclosed herein may address, among others, the technical problem of limited computing resources by more efficiently marshaling limited computing resources for performing verifications.

In an embodiment, a method for managing operation of a data processing system is disclosed. The method may include obtaining a low overhead workorder for an operation for performance by the data processing system; identifying a certificate chain of low overhead certificates that establishes a chain of delegation between a requestor of the low overhead workorder and a root of trust for the data processing system; making a first determination regarding whether signatures in the low overhead certificates can be sequentially verified using public keys; in a first instance of the first determination where the signatures in the low overhead certificates are sequentially verified: making a second determination regarding whether one way results in the low overhead certificates can be sequentially verified using content of the low overhead certificates; in a first instance of the second determination where the one way results in the low overhead certificates are sequentially verified: making a third determination regarding whether authorizations for operations in the low overhead certificates can be sequentially verified using the content of the low overhead certificates; and in a first instance of the third determination where the authorizations for the operations in the low overhead certificates are sequentially verified: initiating performance of the operation by the data processing system.

The low overhead workorder may include a first instance of three fields for content; a first one way result of the content of the first instance of the three fields; and a signature for the content of the first instance of the three fields and the first one way result.

A first field of the first instance of the three fields may include a tokenized representation indicating that the operation is to be performed, a second field of the first instance of the three fields may include a null indicator, and a third field of the first instance of the three fields may include a nonce.

A low overhead certificate of the certificate chain may include a second instance of the three fields for second content; a second one way result of the second content of the second instance of the three fields; and a signature for the second content of the second instance of the three fields and the second one way result.

A first field of the second instance of the three fields may include a tokenized representation indicating a delegation operation, a second field of the second instance of the three fields may include a public key of an entity that is a target for the delegation operation, and a third field of the second instance of the three fields may include a tokenized representation indicating a class of operations for which rights of the entity are impacted by the delegation operation.

The delegation operation may indicate that the entity is authorized or not authorized to invoke performance of the class of operations.

The low overhead certificate may also include a fourth field for third content, the third content being a tokenized representation of a resource to which application of the delegation operation is limited.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of endpoint devices 100. Endpoint devices 100 may provide various computer implemented services independently and/or cooperatively.

To manage performance of the computer implemented services, requests to perform certain operations may be received by endpoint devices 100. The requested operations, if performed, may change how the computer implemented services, may cause new or different services to be provided, may cause some computer implemented services to no longer be provided, and/or may otherwise modify the operation of the endpoint performing the operations.

However, performance of operations may not always result in desirable outcomes. For example, endpoint devices 100 may be part of a distributed system where malicious entities may attempt to coopt endpoint devices 100, where devices that may not be operating as expected may be located, and/or where other challenges to continued desirable operation of endpoint devices 100 may located. Consequently, any request received by an endpoint device may present at least some degree of risk to continued nominal operation of the receiving endpoint device if requested operation from the request are performed.

Additionally, some of endpoint devices 100 may have limited availability of computing resources. For example, any of endpoint devices 100 may have limited processing, memory, and/or storage resources. Consequently, performing processes for screening requests may limit the ability of these endpoint devices 100 from providing other desired functionalities, and/or any of endpoint devices 100 may lack sufficient computing resources to perform certain types of screening processes for received requests.

In general, embodiments disclosed herein may provide methods, systems, and/or devices for screening requests received by endpoint devices 100. Endpoint devices 100 may implement a framework for screening received requests in different manners depending on the computing resources available to each endpoint device. For endpoint devices 100 that include certain levels of computing resources, the framework may require that all workorders (e.g., requests for performances of certain operations) be cryptographically verified back to a root of trust for the endpoint device prior to performance of the operations requested for performance in the workorders. The workorders may be signed requests verifiable using a certificate chain (i) that is cryptographically verifiable and (ii) that extends from the signature in the workorder back to the root of trust.

For endpoint devices 100 that lack certain levels of computing resources, the framework may require that (i) low overhead workorders are used to request performance of certain operations, and (ii) that low overhead certificates be used. In contrast to workorders, low overhead workorders may be data structures that include a bare minimum of information such that the data structure (i) may be validated (e.g., is signed can be verified using a low overhead certificate chain), (ii) that an operation to be performed is identified, and/or (iii) that replay attacks may be prevented. Similarly, in contrast to certificates, low overhead certificates may be data structures that include a bare minimum of information such that the data structure (i) may be validated (e.g., is signed and is part of a low overhead certificate chain), and (ii) that indicates a type of delegation of authority to an entity (and/or with limits on the extent of the delegation). Refer to FIG. 2A for additional details regarding certificates, refer to FIG. 2B for additional details regarding workorders, refer to FIG. 2D for additional details regarding low overhead certificates, and refer to FIG. 2E for additional details regarding low overhead workorders.

By implementing the framework, any of endpoint devices 100 having limited computing resources may be able to perform verifications for requests for performances of certain operations while limiting the impact of the verifications on the other functions provided by the endpoint devices, and may enable certain endpoint devices 100 that would otherwise be unable to perform verifications due to limited computing resources to perform the verifications of the requests.

To provide the above noted functionality, the system of FIG. 1 may include endpoint devices 100, requesting device 110, and verification management system 120. Each of these components is discussed below.

Endpoint devices 100 may, as noted above, provide computer implemented services. To provide the computer implemented services, endpoint devices 100 may receive requests (e.g., workorders) for performance of various operations. Prior to performing the operations, endpoint devices 100 may verify the requests in accordance with a security framework implemented by the endpoint device.

As part of implementing the security framework, an endpoint device may (i) require that all workorders be low overhead, (ii) use low overhead certificates to verify the requests, and/or (iii) obtain low overhead certificates, public keys, and/or other types of information used in the verification process from verification management system 120. Refer to FIGS. 2C and 2F-2H for additional details regarding performing verifications of workorders using certificates and low overhead certificates.

Requesting device 110 may request changes in the operation of endpoint devices 100. The requests may be for any number and types of changes in the operation of endpoint devices 100. To do so, requesting device 110 may generate and send low overhead workorders to any of endpoint devices 100. Refer to FIG. 2E for additional details regarding low overhead workorders.

Verification management system 120 may distribute keys, certificates, and/or other data structures used to verify workorders. For example, verification management system 120 may public keys, low overhead certificates, etc.

Figure 3A:
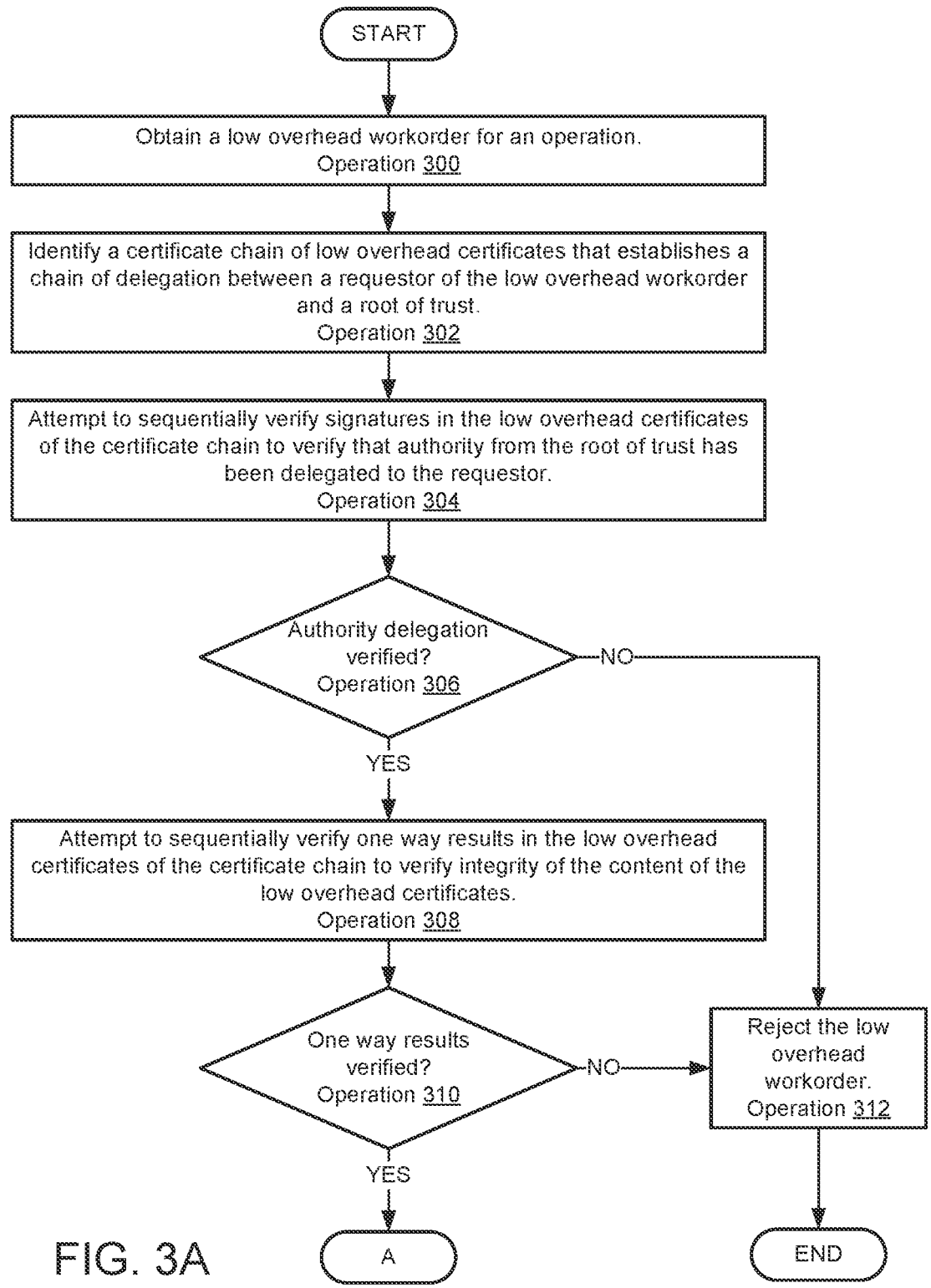
FIGS. 3A-3B show flow diagrams illustrating a method in accordance with an embodiment.
Figure 3B:
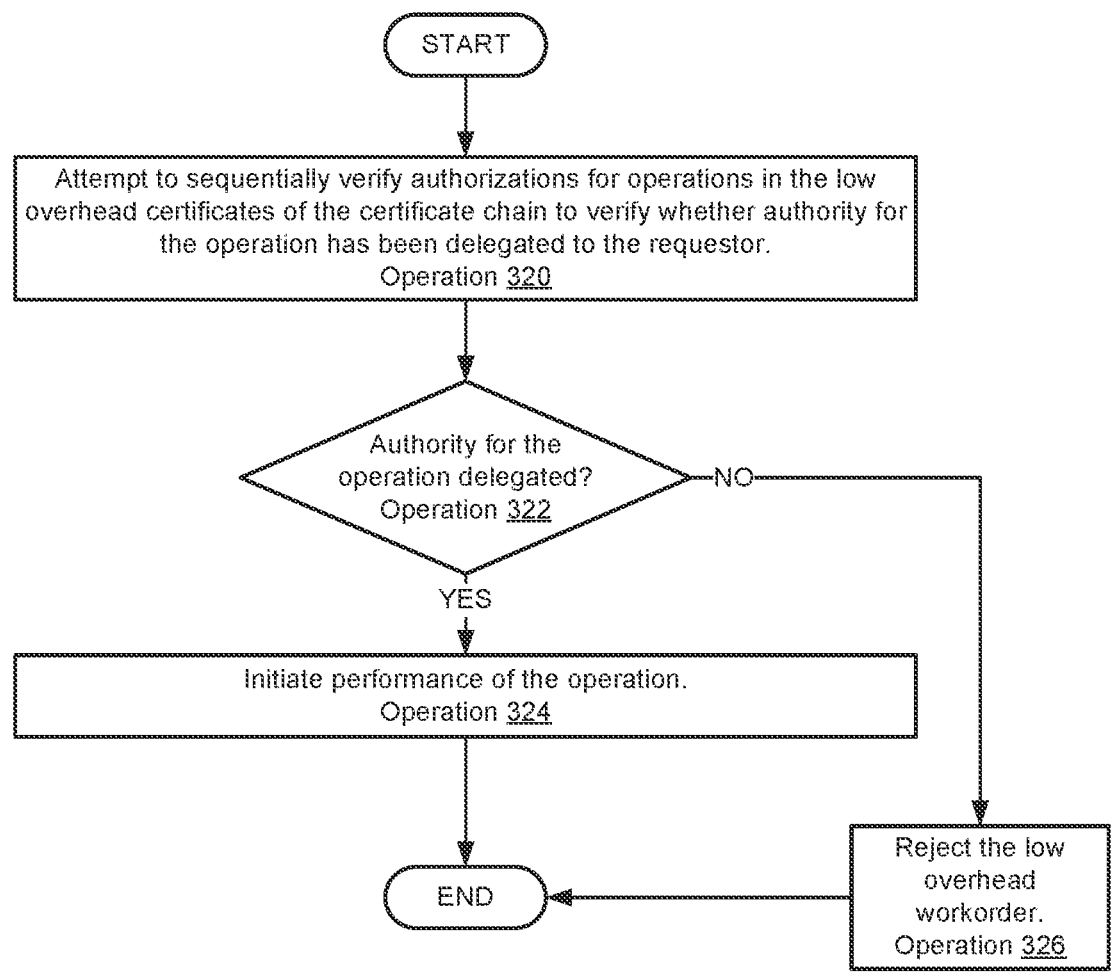

When providing their functionality, any of endpoint devices 100, requesting device 110, and verification management system 120 may perform all, or a portion, of the methods illustrated in FIGS. 3A-3B.

Any of endpoint devices 100, requesting device 110, and verification management system 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In an embodiment, an endpoint device may be implemented using an embedded computing device such as a micro controller or other programmable digital logic device that has limited available computing resources. The endpoint device may be specialized and may perform certain functions as part of a broader system. For example, the endpoint device may be power control device that may facilitate remote shut down and/or start up of other systems (e.g., such as larger scale computing devices, integrated systems, etc.). The endpoint device may be part of, for example, an out of band management system for a host device, and may include independent communication interfaces such that the endpoint device is able to continue operation while other portions of the host system is inoperable.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

As discussed above, endpoint devices having computing resources exceeding a threshold may use certificates and workorders 102 to manage their operation (e.g., in contrast to other types of endpoint devices which may require use of low overhead certificates and workorders to manage their operation).

Turning to FIG. 2A, a diagram of certificate 200 in accordance with an embodiment is shown. Certificate 200 may be implemented using one or more data structures usable to delegate authority. To do so, certificate 200 may include delegation statement 202, authorization statement 204, resource statement 206, and signature 208.

Delegation statement 202 may specify to whom an authority is delegated by certificate 200. Delegation statement 202 may include an identifier for the entity to which the authority is being delegated.

Authorization statement 204 may specify the permission delegated to the entity by certificate 200. Authorization statement 204 may include an identifier of the permission.

Resource statement 206 may specify limitations on the delegation such as on which endpoint devices the delegation of authorization is made. Resource statement 206 may include identifiers of the endpoint devices (or macro statements such that portions of the endpoint devices which the permission is being delegated can be discriminated from other portions of the endpoint devices for which the permission is not being delegated).

Signature 208 may be a cryptographically verifiable signature for the content (e.g., 202-206) of certificate 200. Signature 208 may be signed with a private key of the entity delegating the permission to the delegate.

Any of the statements may be long form, and may not be specifically limited in length. Consequently, the length of these statements and content included therein may be variable. Further, any type of permission may be delegated with any number and type of limitations imposed by the resource statement. Thus, certificate 200 may not be of a fixed size, and may vary depending on the content of certificate 200.

Figure 2C:
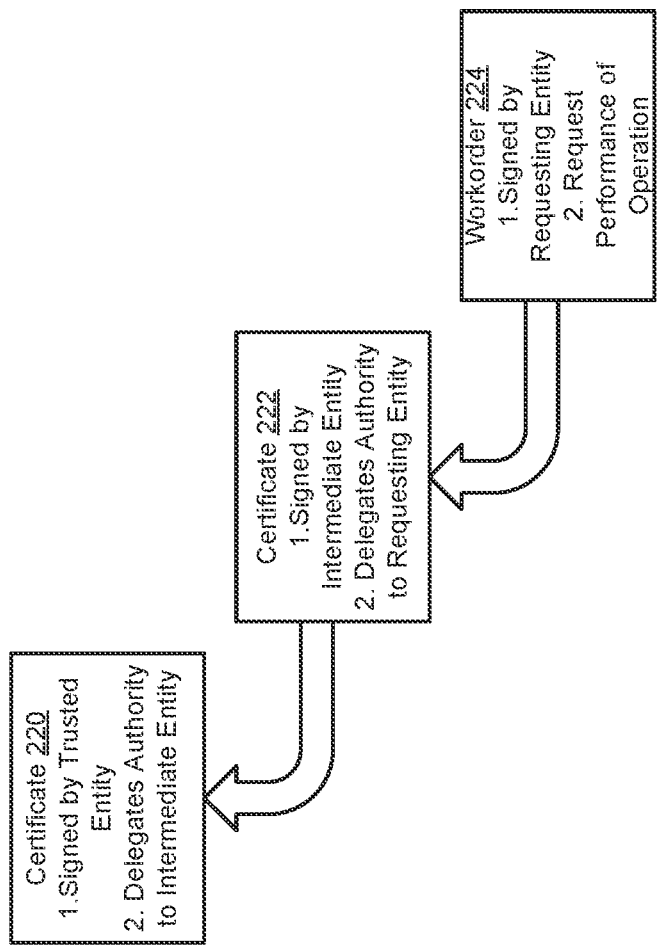
FIG. 2C shows a diagram illustrating verification of a workorder in accordance with an embodiment.

Additionally, while illustrated with a finite number of statements, it will be appreciated that a certificate may include any number of such statements. Consequently, parsing any certificate may require any quantity of computing resources depending on the length and complexity of the statements included therein. Further, different certificates may, due to this variability, also require varying quantities of computing resources. Accordingly, it may not be possible to know whether an endpoint device with limited computing resources may even be capable of parsing a certificate let alone multiple certificates necessary to perform verifications of certificates. Refer to FIG. 2C for additional details regarding verifying chains of certificates and workorders.

Turning to FIG. 2B, a diagram of workorder 210 in accordance with an embodiment is shown. Workorder 210 may be implemented using one or more data structures usable to invoke performance of an operation by an endpoint device. To do so, workorder 210 may include requestor statement 212, action statement 214, resource statement 216, and signature 218.

Requestor statement 212 may specify which entity is requesting performance of an operation. Requestor statement 212 may include an identifier for the entity.

Action statement 214 may specify the operation to be performed by an endpoint device. Action statement 214 may include an identifier of the action.

Resource statement 216 may specify an endpoint to perform the operation. Resource statement 216 may include an identifier of the endpoint device (or macro statements such that portions of the endpoint devices which are to perform the operation can be discriminated from other portions of the endpoint devices which are not to perform the operation).

Signature 218 may be a cryptographically verifiable signature for the content (e.g., 212-216) of workorder 210. Signature 218 may be signed with a private key of the entity requesting that the operation be performed.

Like certificate 200, workorder 210 may be of variable length thereby preventing low resources availability endpoints from verifying workorder 210. Refer to FIG. 2C for additional details regarding verifying chains of certificates and workorders.

Turning to FIG. 2C, a diagram illustrating verification of workorder 224 in accordance with an embodiment is shown. Consider a scenario where workorder 224 has been signed by a requesting entity and request performance of an operation. To verify workorder 224, an endpoint device may obtain (i) certificates 220 and 222 (e.g., a chain of certificates to a trusted entity) and (ii) a public key for the requesting entity.

Certificate 220 may include statements delegating authority for performance of the operation to intermediate entity. Certificate 222 may include a statements delegating authority for performance of the operation to the requesting entity. These, these certificates may establish a chain that delegates authority from the trusted entity (e.g., a root of trust with permission for performance of all operations, or at least the requested operation) to the requested entity. Thus, if this chain can be cryptographically verified, then the authority of the requesting entity to initiate performance of the operation may be verified.

To perform the cryptographic verification, workorder 224 may be initially verified by checking the signature of workorder 224 using the public key of the requesting entity. Once initially verified, certificate 222 may be verified using a public key for the entity that signed it. In this example, the intermediate entity signed certificate 222 and which can be verified using a public key for the intermediate entity. Once certificate 222 is verified, then certificate 220 may be verified. In this example, trusted entity may have signed certificate 220 and can be verified using a public key for the trusted entity (e.g., which may be conveyed to the endpoint device via any method, such as during onboarding when various keys are distributed to the endpoint device).

While illustrated here with a certificate chain of two certificates, it will be appreciated that a certificate chain may include any number of certificates. However, regardless of the length of each certificates, any endpoint device may lack sufficient available computing resources to parse and complete the cryptographic operations necessary to verify the certificate chains and workorders.

To facilitate verification of certificate and workorder chains by endpoint devices having limited computing resources, low overhead versions of certificates and workorders may be used. The low overhead versions may (i) fixed size and/or fixed content data structure, (ii) enable extraction and verification of each certificate/workorder using a same process, and/or (iii) use tokenization to efficiently convey information.

Turning to FIG. 2D, a diagram of low overhead certificate 230 in accordance with an embodiment is shown. Low overhead certificate 230 may include operation statement field 232, public key field 234, authorization statement field, one way result 238, and signature 240.

Operation statement field 232 may be a fixed number of bits that represents a type of delegation being made by low overhead certificate 230. The type of delegation may either be an authorization or a removal of authorization for a type of operation performable by an endpoint device. The fixed number of bits may store a token that may be used to identify the type of the delegation being made (e.g., different tokens may be used to represent different types of delegations).

If operation statement field 232 is an authorization, then low overhead certificate 230 may be a delegation of permission to invoke a function performable by an endpoint device.

Public key field 234 may be a fixed number of bits for storing a public key for an entity to which the delegation is being made by low overhead certificate 230.

Authorization statement field 236 may be a fixed number of bits for storing a token that identifies the operation performable by the endpoint device that is being delegated by low overhead certificate 230. The token stored in authorization statement field 236 may be used to identify the delegated operation by, for example, performing a lookup in a data structure that associated different tokens with different operations performable by the endpoint device.

The token stored in authorization statement field 236 (or other fields, or may be stored as an independent, additional token in another field not shown in FIG. 2D) may also indicate (e.g., by enabling a lookup to be performed for) limitations on the delegation. For example, the token may indicate the resources for which the permission is delegated. Thus, the delegation may be restricted to certain endpoint devices, groups of endpoint devices, etc.

One way result 238 may be a fixed number of bits that allow the integrity of content (e.g., 232-236) of low overhead certificate 230 to be verified. For example, one way result 238 may be result of a one way function when the content is ingested by the function. The one way function may be a hash function or other type of function, and one way result 238 may be a hash or other type of output of a one way function.

Signature 240 may be a cryptographically verifiable signature for the content (e.g., 232-236) and/or one way result 238 of low overhead certificate 230. Signature 240 may be signed with a private key of the entity making the delegation.

Turning to FIG. 2E, a diagram of low overhead workorder 250 in accordance with an embodiment is shown. Low overhead workorder 250 may include operation statement field 252, public key field 254, authorization statement field 256, one way result 258, and signature 260. These fields, one way result, and signature may be similar to those shown in FIG. 2D. Thus, similar methods of verification and parsing may be performed.

However, the content of low overhead workorder 250 may be different from low overhead certificate 230. For example, operation statement field 252 may include a token indicating an operation to be performed by an endpoint device. For example, the token may, when a lookup is performed, indicate that the operation is to power on the endpoint device, power off the endpoint device, etc. Thus, the content of operation statement field 252 may indicate operations to be performed by an endpoint device rather than indicating a type of delegation being made via low overhead certificate 230.

Public key field 254 may, rather than including a public key like public key field 234, may include a null entry, include a token indicating that no public key is included, etc.

Authorization statement field 256 may, rather than including a token indicating a type of operation for which a delegation of authority is being made, may include a nonce usable to prevent replay attacks. For example, when a low overhead workorder is being generated, a nonce from an endpoint device (or other entity which may manage replay attack prevention) may be obtained. The nonce may allow the endpoint device (or other entity) to reduce the likelihood that the low overhead workorder is only performed once by the endpoint device (e.g., a malicious entity may attempt to use a properly generated and verifiable low overhead workorder repeatedly to induce endpoint devices to repeatedly perform an operation).

One way result 258 may be a fixed number of bits that allow the integrity of content (e.g., 252-256) of low overhead workorder 250 to be verified. For example, one way result 258 may be result of a one way function when the content is ingested by the function, similarly to one way result 238 as discussed above.

Signature 260 may be a cryptographically verifiable signature for the content (e.g., 252-256) and/or one way result 258 of low overhead workorder 250. Signature 260 may be signed with a private key of the entity requesting performance of the operation identified by the token of operation statement field 252.

Using these low overhead certificates and workorders, endpoint devices having lower levels of computing resources may be able to verify workorders back to a root of trust.

Figure 2F:
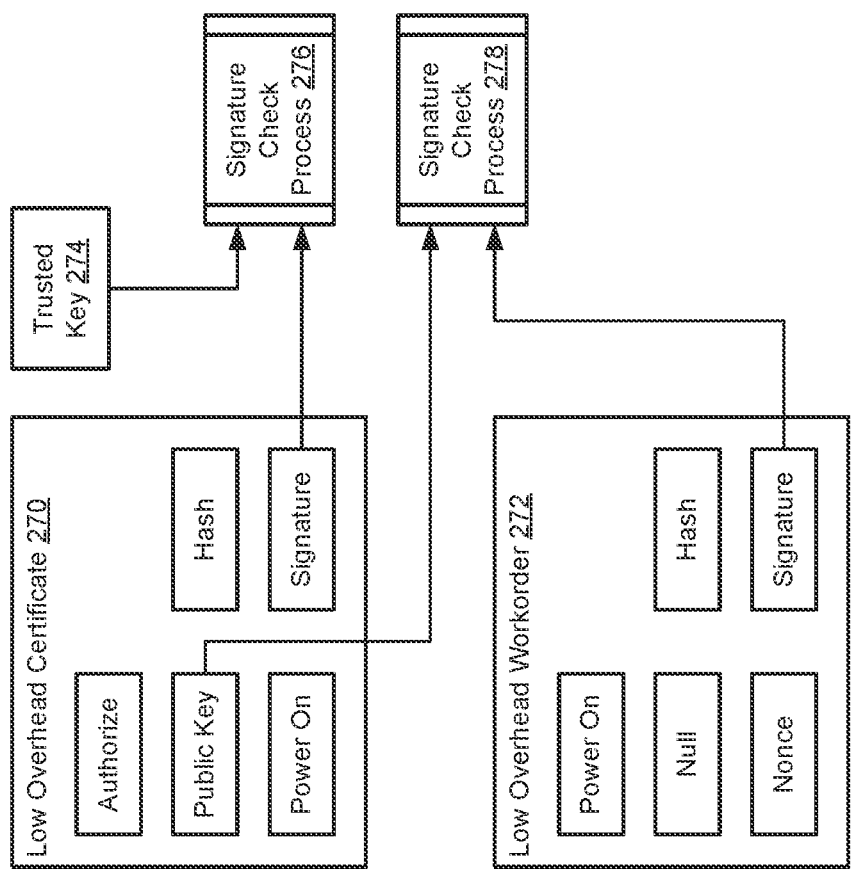
FIGS. 2F-2H show data flow diagrams in accordance with an embodiment.

Turning to FIG. 2F, a first data flow diagram of a verification of a low overhead workorder 272 in accordance with an embodiment is shown. In FIG. 2F, low overhead certificate 270 and low overhead workorder 272 are shown, and may have content similar to low overhead certificate 230 and low overhead workorder 250, respectively.

Upon receipt by an endpoint device, the security framework of the endpoint device may initiate signature checking processes 276-278. In signature check process 278, the signature of low overhead workorder 272 may be verified using the public key from low overhead certificate 270. In signature check process 276, the signature of low overhead certificate 270 may be checked using a public key from another low overhead certificate higher in a certificate chain, or trusted key 274 if low overhead certificate 270 is at the top of the chain. Trusted key 274 may be a public key of an entity trusted by the endpoint device and that has authority to invoke a functionality indicated by low overhead workorder 272.

In this example, the functionality is to power on and is indicated by a token (represented by the box labeled as "Power On") included in the appropriate field of low overhead workorder 272.

If the signatures can be verified in this manner, then the chain may be deemed to be verified by the endpoint device.

Figure 2G:
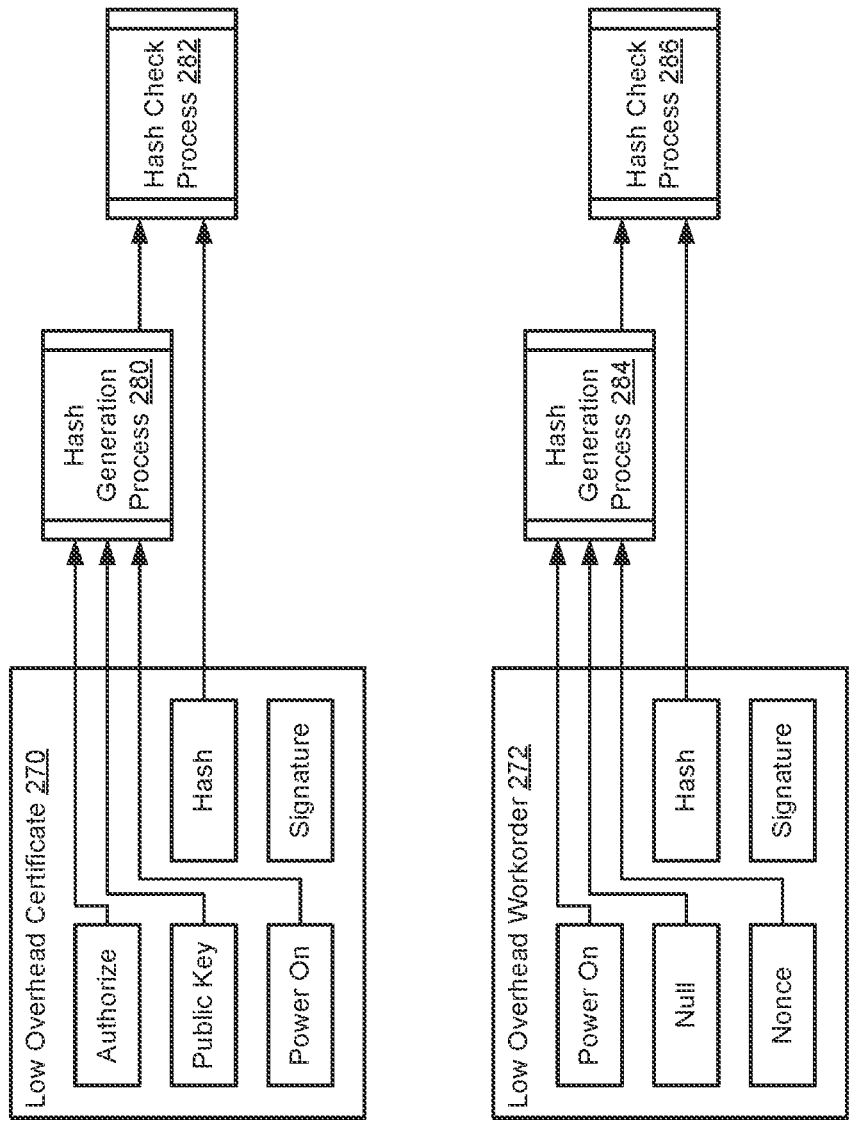

Turning to FIG. 2G, a second data flow diagram of a verification of a low overhead workorder 272 in accordance with an embodiment is shown.

To verify the content of each certificate in the low overhead certificate chain, and the low overhead workorder, the security framework of the endpoint device may initiate performance of hash generation processes 280, 284 and hash check processes 282 for each certificate and the workorder.

During each hash generation process 280, a hash of the tokens and public key in each low overhead certificate may be generated. A hash of the tokens and the nonce of low overhead workorder 272 may also be generated.

Once generated, hash check processes 282, 286 may compare the hash generated for each low overhead certificate to the hash included in the corresponding certificate, and the hash generated for low overhead workorder 272 may be compared to the hash included in low overhead workorder 272. If the hashes match, then the content of the corresponding low overhead certificate and low overhead workorder 272 may be deemed to be verified.

Similarly, the signatures may also be used to verify the integrity of the corresponding hashes included in the certificate/workorder.

Figure 2H:
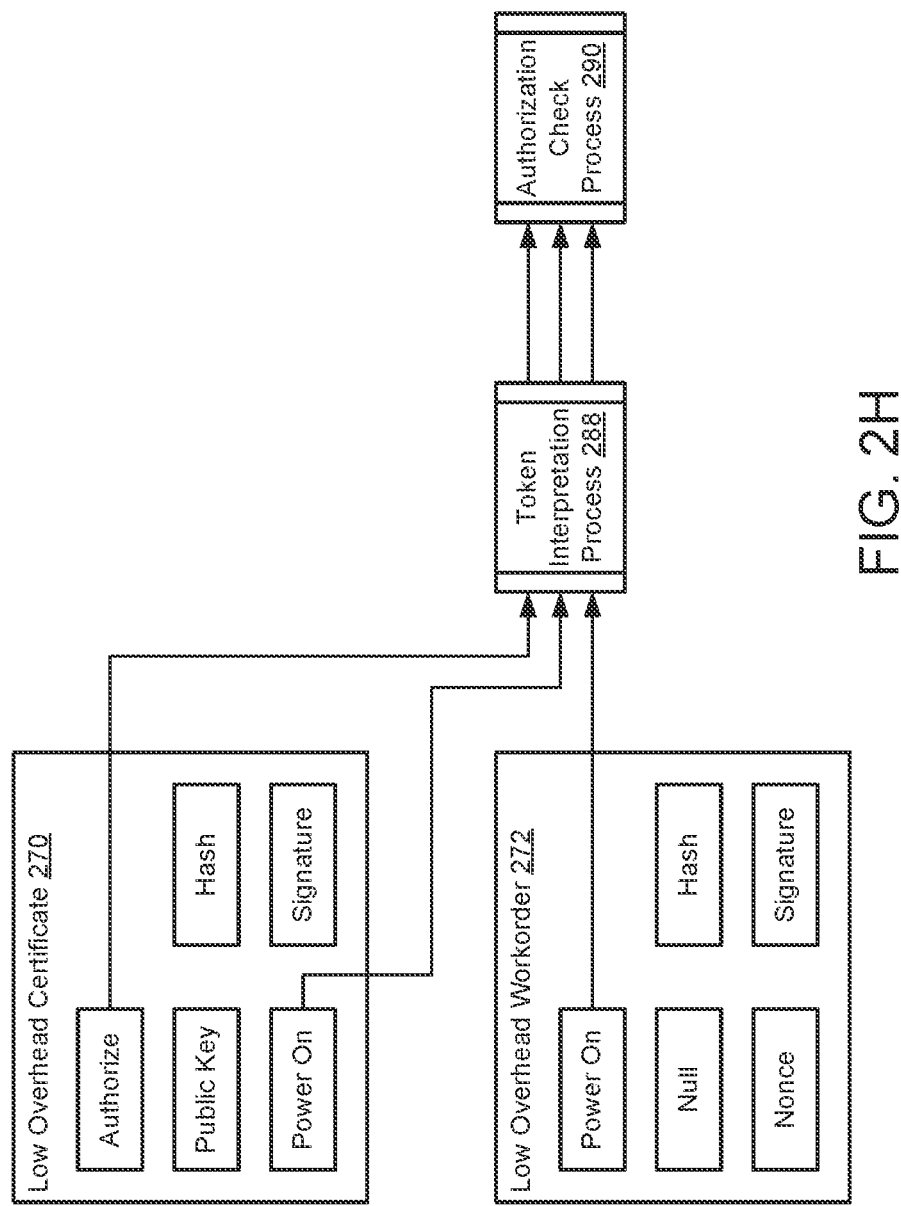

Turning to FIG. 2H, a third data flow diagram of a verification of a low overhead workorder 272 in accordance with an embodiment is shown.

To ascertain whether authority for performance of the requested operation (e.g., powering on in this example) has been delegated to the requesting entity (e.g., the entity whose public key is used to sign low overhead workorder 272), token interpretation process 288, and authorization check process 290 may be performed for each delegation in the chain of low overhead certificates.

During token interpretation process 288, lookups or other operations may be performed to identify the meaning of tokens included in the fields of certificates and/or workorders. For example, for a low overhead certificate in the low overhead certificate chain, lookups or other processes may be performed for the tokens in the operation statement field and authorization statement field to identify the meaning conveyed by these tokens. Additionally, a lookup may be performed for a token in the operation statement field in the next lower low overhead certificate in the low overhead certificate chain. The meanings conveyed by these tokens may be used to identify whether authority for the operation requested to be performed by the endpoint device by low overhead workorder 272 is delegated by the respective certificate.

A similar token interpretation may be performed for the field of low overhead workorder 272 that includes a token indicating the type of operation to be performed by the endpoint device.

The results of these interpretations may be used in authorization check process 290 to ascertain whether authority for invoking performance of the operation requested in low overhead workorder 272 has been actually delegated. In other words, each certificate is interrogated to identify whether authorization for the particular requested operation has been delegated by each certificate in the chain.

However, by using tokenized versions of the representations, low overhead certificate 270 and low overhead workorder 272 may be implemented with fixed size and fixed data thereby allowing a standardized process for verifying that the delegations have or have not been made for the operation.

The specific form and content of the tokens may vary depending on implementation. Corresponding lookup data structures necessary to interpret the tokens may implemented and distributed to the endpoint devices as necessary.

For example, if only three operations corresponding to power on, power off, and enter standby mode are to be made available for delegation, then tokens for the authorization statement field may only need to be two bits in length. A lookup data structure may associate the respective three functions with corresponding binary representations of 1, 2, and 3. Thus, in this example, if the authorization statement field of a low overhead certificate includes a binary representation of 1, the token may be interpreted to mean that the operation is power on; if the authorization statement field of a low overhead certificate includes a binary representation of 2, the token may be interpreted to mean that the operation is power off; and if the authorization statement field of a low overhead certificate includes a binary representation of 3, the token may be interpreted to mean that the operation is to enter standby mode.

As discussed above, the components of FIG. 1 may perform various methods to verify operations to manage the operation of endpoint devices. FIGS. 3A-3B illustrates a method that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method for distributions of workload across infrastructure in accordance with an embodiment is shown. The method may be performed by any of endpoint devices 100, requesting device 110, verification management system 120, and/or other components of the system shown in FIG. 1.

At operation 300, a low overhead workorder for an operation is obtained. The low overhead workorder may be obtained by (i) receiving it from a requesting device that generated it, (ii) reading it from storage, and/or via other methods.

At operation 302, a certificate chain of low overhead certificates that establishes a chain of delegation between a requestor of the low overhead workorder and a root of trust is identified. The certificate chain may be identified reviewing low overhead certificates to link any number of low overhead certificates together in a chain that allege delegation of authority for invocation of the operation from the root of trust to the requestor. The links may be established by (i) screening the low overhead certificates for those that delegate authority for invocation of the operation, and (ii) identifying delegations in the screened low overhead certificates that delegate from the root of trust to the requestor.

To perform the screening, token included in the fields of the low overhead certificates and the low overhead workorder may be interpreted using (i) rules for interpretation, (ii) a lookup table, and/or via other methods. The interpretation may allow for the type and scope of the delegations to be discerned based on the tokens.

At operation 304, an attempt to sequentially verify signatures in the low overhead certificates of the certificate chain (e.g., including the low overhead workorder) is made to verify that authority from the root of trust has been delegated to the requestor. The signatures may be verified using public keys from the low overhead certificates, a public key of the root of trust, and a public key of the requestor. Refer to FIG. 2F for additional details.

At operation 306, a determination is made regarding whether authority for the delegation has been verified based on the attempt made in operation 304. If the signatures are sequentially verified, then it may be determined that authority for the delegation has been verified, and the method may proceed to operation 308. In contrast, if any of the signatures cannot be sequentially verified, then it may be determined that authority for the delegation has been verified, and the method may proceed to operation 312.

At operation 308, an attempt to sequentially verify one way results in the low overhead certificates of the certificate chain to verify integrity of the content of the low overhead certificates and low overhead workorder is performed. The one way results may be verified by generating one way results for the content, and comparing the one way results to similar one way results included in the respective certificate or workorder. Refer to FIG. 2G for additional details.

At operation 310, a determination is made regarding whether the one way results can be verified. If all of the generated one way results (e.g., from operation 308) match the corresponding one way results in the respective certificate/workorder, then it may be determined that the one way results are verified and the method may proceed to operation 320 shown in FIG. 3B. If any of the generated one way results (e.g., from operation 308) do not match the corresponding one way results in the respective certificate/workorder, then it may be determined that the one way results are not verified and the method may proceed to operation 312.

Turning to FIG. 3B, a flow diagram illustrating a continuation of the method for distributions of workload across infrastructure in accordance with an embodiment is shown.

At operation 320, an attempt to sequentially verify authorizations for operations in the low overhead certificates of the certificate chain is performed to verify whether authority for the operation has been delegated to the requestor. The authorizations for the operations may be sequentially verified by checking whether the authorization statement field of each low overhead certificates indicates that delegation of the operation in the low overhead workorder is granted.

To perform the checking, tokens included in the field of the low overhead certificates and/or the low overhead workorder may be interpreted using (i) rules for interpretation, (ii) a lookup table, and/or via other methods. The interpretation may allow for the type of operation to be performed (e.g., as specified by the token from the low overhead workorder) and delegated authorities for invoking operations (e.g., as specified by the tokens from the low overhead certificates). The checking may be performing, for example, as shown in and discussed with respect to FIG. 2H.

At operation 322, a determination is made regarding whether authority for the operation has been delegated (e.g., to the requestor). If all of the operation delegations from the low overhead certificates match the type of the operation indicated by the low overhead workorder, then it may be determined that the authority for the operation has been delegated and the method may proceed to operation 324. If any of the operation delegations (e.g., and/or the scope, such as limited to which resources the delegation of authority applies to) from the low overhead certificates do not match the type of the operation (e.g., and scope) indicated by the low overhead workorder, then it may be determined that the authority for the operation has not been delegated and the method may proceed to operation 326.

At operation 324, performance of the operation is initiated. The performance may be initiated by performing one or more actions, or requesting that another entity perform the one or more actions. The one or more actions may include any type and quantity of actions. The actions may include, for example, turning on (e.g., powering), shutting off, and/or otherwise modifying operation of an endpoint device.

The method may end following operation 324.

Returning to operations 312 and 326, shown in FIGS. 3A and 3B, respectively, the low overhead workorder may be rejected during these operations. The low overhead workorder may be rejected by not performing the operations requested in the low overhead workorder, sending information to a requestor of performance of the low overhead workorder indicating that the low overhead workorder will not be performed, etc.

The method may end following operations 312 or 326.

Using the method illustrated in FIGS. 3A-3B, embodiments disclosed herein may provide a framework for managing requests for performances of various operations while managing risks associated with the requested operations. The framework may use tokenization and fixed size/data structures that allow for verification processes to performed using limited quantities of computing resources. Thus, the framework may be broadly applicable to range of endpoint devices that may otherwise not be able to verify workorders due to limited availability of computing resources.

Figure 4:
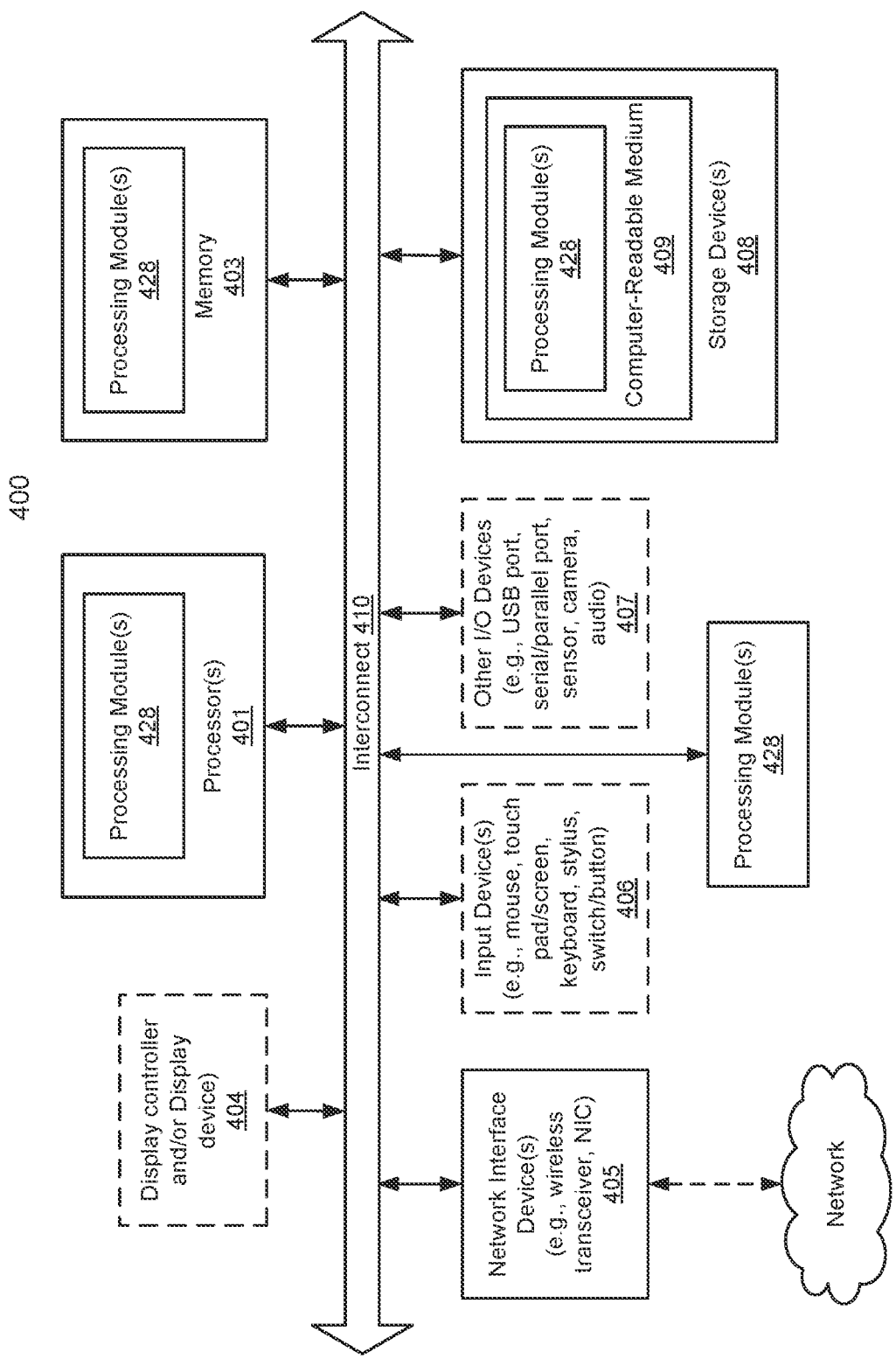
FIG. 4 shows a block diagram illustrating a data processing system in accordance with an embodiment.

Any of the components illustrated in FIGS. 1-2H may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
   obtaining a low overhead workorder for an operation for performance by the data processing system;
   identifying a certificate chain of low overhead certificates that establishes a chain of delegation between a requestor of the low overhead workorder and a root of trust for the data processing system;
   making a first determination regarding whether signatures in the low overhead certificates can be sequentially verified back to the root of trust using public keys;
   in a first instance of the first determination where the signatures in the low overhead certificates are sequentially verified back to the root of trust:
      making a second determination regarding whether one way results in the low overhead certificates can be sequentially verified back to the root of trust using content of the low overhead certificates;
      in a first instance of the second determination where the one way results in the low overhead certificates are sequentially verified back to the root of trust:
         making a third determination regarding whether authorizations for operations in the low overhead certificates can be sequentially verified back to the root of trust using the content of the low overhead certificates; and
         in a first instance of the third determination where the authorizations for the operations in the low overhead certificates are sequentially verified back to the root of trust:
            initiating performance of the operation by the data processing system.

2. The method of claim 1, wherein the low overhead workorder comprises:
   a first instance of three fields for content;
   a first one way result of the content of the first instance of the three fields; and
   a signature for the content of the first instance of the three fields and the first one way result.

3. The method of claim 2, wherein a first field of the first instance of the three fields comprises a tokenized representation indicating that the operation is to be performed, a second field of the first instance of the three fields comprises a null indicator, and a third field of the first instance of the three fields comprises a nonce.

4. The method of claim 3, wherein a low overhead certificate of the certificate chain comprises:
   a second instance of the three fields for second content;
   a second one way result of the second content of the second instance of the three fields; and
   a signature for the second content of the second instance of the three fields and the second one way result.

5. The method of claim 4, wherein a first field of the second instance of the three fields comprises a tokenized representation indicating a delegation operation, a second field of the second instance of the three fields comprises a public key of an entity that is a target for the delegation operation, and a third field of the second instance of the three fields comprises a tokenized representation indicating a class of operations for which rights of the entity are impacted by the delegation operation.

6. The method of claim 5, wherein the delegation operation indicates that the entity is authorized or not authorized to invoke performance of the class of operations.

7. The method of claim 6, wherein the low overhead certificate further comprises:
   a fourth field for third content, the third content being a tokenized representation of a resource to which application of the delegation operation is limited.

8. A non-transitory machine-readable medium having instructions stored therein, which when executed by a processor, cause the processor to perform operations for managing operation of a data processing system, the operations comprising:
   obtaining a low overhead workorder for an operation for performance by the data processing system;
   identifying a certificate chain of low overhead certificates that establishes a chain of delegation between a requestor of the low overhead workorder and a root of trust for the data processing system;
   making a first determination regarding whether signatures in the low overhead certificates can be sequentially verified back to the root of trust using public keys;
   in a first instance of the first determination where the signatures in the low overhead certificates are sequentially verified back to the root of trust:
      making a second determination regarding whether one way results in the low overhead certificates can be sequentially verified back to the root of trust using content of the low overhead certificates;
      in a first instance of the second determination where the one way results in the low overhead certificates are sequentially verified back to the root of trust:
         making a third determination regarding whether authorizations for operations in the low overhead certificates can be sequentially verified back to the root of trust using the content of the low overhead certificates; and
         in a first instance of the third determination where the authorizations for the operations in the low overhead certificates are sequentially verified back to the root of trust:
            initiating performance of the operation by the data processing system.

9. The non-transitory machine-readable medium of claim 8, wherein the low overhead workorder comprises:
   a first instance of three fields for content;
   a first one way result of the content of the first instance of the three fields; and
   a signature for the content of the first instance of the three fields and the first one way result.

10. The non-transitory machine-readable medium of claim 9, wherein a first field of the first instance of the three fields comprises a tokenized representation indicating that the operation is to be performed, a second field of the first instance of the three fields comprises a null indicator, and a third field of the first instance of the three fields comprises a nonce.

11. The non-transitory machine-readable medium of claim 10, wherein a low overhead certificate of the certificate chain comprises:
   a second instance of the three fields for second content;

a second one way result of the second content of the second instance of the three fields; and a signature for the second content of the second instance of the three fields and the second one way result.

12. The non-transitory machine-readable medium of claim 11, wherein a first field of the second instance of the three fields comprises a tokenized representation indicating a delegation operation, a second field of the second instance of the three fields comprises a public key of an entity that is a target for the delegation operation, and a third field of the second instance of the three fields comprises a tokenized representation indicating a class of operations for which rights of the entity are impacted by the delegation operation.

13. The non-transitory machine-readable medium of claim 12, wherein the delegation operation indicates that the entity is authorized or not authorized to invoke performance of the class of operations.

14. The non-transitory machine-readable medium of claim 13, wherein the low overhead certificate further comprises:

a fourth field for third content, the third content being a tokenized representation of a resource to which application of the delegation operation is limited.

15. A data processing system, comprising:

a processor; and a memory coupled to the processor to store instructions, which when executed by the processor, cause the processor to perform operations for managing operation of the data processing system, the operations comprising:

obtaining a low overhead workorder for an operation for performance by the data processing system;

identifying a certificate chain of low overhead certificates that establishes a chain of delegation between a requestor of the low overhead workorder and a root of trust for the data processing system;

making a first determination regarding whether signatures in the low overhead certificates can be sequentially verified back to the root of trust using public keys;

in a first instance of the first determination where the signatures in the low overhead certificates are sequentially verified back to the root of trust:

making a second determination regarding whether one way results in the low overhead certificates can be sequentially verified back to the root of trust using content of the low overhead certificates;

in a first instance of the second determination where the one way results in the low overhead certificates are sequentially verified back to the root of trust:

making a third determination regarding whether authorizations for operations in the low overhead certificates can be sequentially verified back to the root of trust using the content of the low overhead certificates; and in a first instance of the third determination where the authorizations for the operations in the low overhead certificates are sequentially verified back to the root of trust:

initiating performance of the operation by the data processing system.

16. The data processing system of claim 15, wherein the low overhead workorder comprises:

a first instance of three fields for content;

a first one way result of the content of the first instance of the three fields; and a signature for the content of the first instance of the three fields and the first one way result.

17. The data processing system of claim 16, wherein a first field of the first instance of the three fields comprises a tokenized representation indicating that the operation is to be performed, a second field of the first instance of the three fields comprises a null indicator, and a third field of the first instance of the three fields comprises a nonce.

18. The data processing system of claim 17, wherein a low overhead certificate of the certificate chain comprises:

a second instance of the three fields for second content;

a second one way result of the second content of the second instance of the three fields; and a signature for the second content of the second instance of the three fields and the second one way result.

19. The data processing system of claim 18, wherein a first field of the second instance of the three fields comprises a tokenized representation indicating a delegation operation, a second field of the second instance of the three fields comprises a public key of an entity that is a target for the delegation operation, and a third field of the second instance of the three fields comprises a tokenized representation indicating a class of operations for which rights of the entity are impacted by the delegation operation.

20. The data processing system of claim 19, wherein the delegation operation indicates that the entity is authorized or not authorized to invoke performance of the class of operations.

* * * * *